(12) United States Patent
Cho

(10) Patent No.: US 9,028,350 B2
(45) Date of Patent: May 12, 2015

(54) CHAIN BELT-TYPE VARIABLE TRANSMISSION

(76) Inventor: Yoon Kyu Cho, Gyeongsangnam-do (KR)

( * ) Notice: Subject to any disclaimer, the term of this patent is extended or adjusted under 35 U.S.C. 154(b) by 134 days.

(21) Appl. No.: 13/976,805

(22) PCT Filed: Dec. 28, 2011

(86) PCT No.: PCT/KR2011/010265
§ 371 (c)(1),
(2), (4) Date: Jun. 27, 2013

(87) PCT Pub. No.: WO2012/091469
PCT Pub. Date: Jul. 5, 2012

(65) Prior Publication Data
US 2013/0274042 A1  Oct. 17, 2013

(30) Foreign Application Priority Data
Dec. 29, 2010 (KR) .................. 10-2010-0137822

(51) Int. Cl.
F16H 55/00 (2006.01)
F16H 9/24 (2006.01)
F16H 55/54 (2006.01)
F16H 63/06 (2006.01)

(52) U.S. Cl.
CPC ............... *F16H 9/24* (2013.01); *F16H 55/54* (2013.01); *F16H 63/067* (2013.01)

(58) Field of Classification Search
CPC ............ F16H 55/54; F16H 9/24; F16H 9/10; F16H 55/48; B62M 9/08
USPC ........................................................ 474/47
See application file for complete search history.

(56) References Cited

U.S. PATENT DOCUMENTS

| 1,446,294 | A | * | 2/1923 | Healey | 474/53 |
| 1,486,590 | A | * | 3/1924 | Landahl | 474/49 |
| 3,798,989 | A | * | 3/1974 | Hunt | 474/49 |
| 3,938,403 | A | * | 2/1976 | Donaldson | 474/56 |
| 4,498,351 | A | * | 2/1985 | Ahoor | 74/439 |
| 4,642,070 | A | * | 2/1987 | Walker | 474/57 |
| 4,878,883 | A | * | 11/1989 | Wheless | 474/51 |
| 5,011,458 | A | * | 4/1991 | Kumm | 474/49 |
| 5,984,814 | A | * | 11/1999 | Davenport | 474/50 |
| 7,713,153 | B2 | * | 5/2010 | Naude | 474/49 |
| 2002/0042314 | A1 | * | 4/2002 | Mimura | 474/56 |
| 2004/0220012 | A1 | * | 11/2004 | Siman-tov | 475/207 |

(Continued)

FOREIGN PATENT DOCUMENTS

KR    10-2007-0054738    5/2007

*Primary Examiner* — Henry Liu
(74) *Attorney, Agent, or Firm* — Jordan and Hamburg LLP

(57) ABSTRACT

A chain belt-type continuously variable transmission in which ratchet-type chain belts are wound on driving and driven pulley devices, each of which has a variable diameter, in order to control the shift ratio. Driving belt supports are disposed in a driving pulley device so as to radially contract and expand. Driven belt supports are disposed in a driven pulley device so as to radially contract and expand. Teeth in the front portions of the driving belt supports and the driven belt supports and teeth in the rear portions of the driving belt supports and the driven belt supports are oriented in opposite directions. Front and rear ratchet gears formed on the driving belt supports and the front and rear ratchet gears formed on the driven belt supports are oriented in opposite directions and are arranged in alternating positions without being formed at corresponding positions in a line.

7 Claims, 14 Drawing Sheets

(56) References Cited

U.S. PATENT DOCUMENTS

| | | |
|---|---|---|
| 2005/0227797 A1* | 10/2005 | Jeng ................................ 474/47 |
| 2005/0233846 A1* | 10/2005 | Green et al. .................... 474/47 |
| 2006/0019781 A1* | 1/2006 | Roby ................................ 474/8 |
| 2008/0058135 A1* | 3/2008 | Naude ............................... 474/8 |
| 2010/0062885 A1* | 3/2010 | Naude ............................. 474/49 |
| 2012/0040788 A1* | 2/2012 | Cho ................................ 474/28 |

* cited by examiner

[Fig. 19B]

CHAIN BELT-TYPE VARIABLE TRANSMISSION

BACKGROUND OF THE INVENTION

The present invention relates to a chain belt-type continuously variable transmission in which ratchet-type chain belts are wound on driving and driven pulley devices, each of which has a variable diameter, in order to control the shift ratio, and more particularly, to a chain belt-type continuously variable transmission in which a plurality of driving belt supports are disposed at predetermined intervals in a driving pulley device so as to radially contract and expand, a plurality of driven belt supports are disposed at predetermined intervals in a driven pulley device so as to radially contract and expand, teeth in the front portions of the driving belt supports and the driven belt supports and teeth in the rear portions of the driving belt supports and the driven belt supports are oriented in opposite directions, front and rear ratchet gears formed on the driving belt supports and the front and rear ratchet gears formed on the driven belt supports are oriented in opposite directions and are arranged in alternating positions without being formed at corresponding positions in a line, two bands of ratchet-type chain belts corresponding to the front and rear ratchet gears are wound on the driving and driven pulley devices such that power can be transmitted in both directions by both of the driving and driven pulley devices, and the driving belt supports disposed in the driving pulley device and the driven belt supports disposed in the driven pulley device are disposed at an incline like teeth of a helical gear in order to reduce vibration and noise when the ratchet-type chain belts engage with and disengage from the belt supports and increase the area where the ratchet gears of the belt supports adjoin the ratchets of the ratchet-type chain belts, thereby accurately transmitting power.

The present applicant is also the application in Korean Patent No. 10-0091522.

The earlier-patented related art (Korean Patent No. 10-0091522) realizes a belt-type continuously variable transmission which includes a variable driving pulley which controls the shift ratio by varying its diameter and a variable driven pulley which is connected to the variable driving pulley via a belt, in which the diameter of the variable driven pulley is varied in an opposite fashion from the variable driving pulley in order to adjust the tension of the belt. A plurality of belt supports are inserted into each of the variable driving and driven pulleys such that the belt supports can radially move. Each of the belt supports has belt-catching ratchet gears which are disposed between a pair of pulley shafts coupled to a pulley shaft. Shift plates are disposed outside the pulley shafts such that they are rotated in opposite directions by a shift plate rotating device so as to move the belt supports in the radial direction. The belt has alternating ratchet gears on the inner circumference thereof which engage with the belt-catching ratchet gears formed on the belt supports of the variable driving pulley and the variable driven pulley. This makes it possible to more easily and efficiently vary the diameter of the variable driving and driven pulleys, thereby realizing a more accurate and efficient continuously variable transmission. In addition, when a load is applied, it is possible to prevent a slip between the pulley and the belt, so that power can be more efficiently transmitted.

However, this continuously variable transmission is configured such that the power is transmitted only in one direction. When driving downhill on a slope using an engine brake, power is not transmitted and a slip occurs, which is problematic.

In addition, the belt supports provided in the related art are horizontally disposed parallel to the pulley shaft. When the belt rotates and is wound on the plurality of belt shafts, vibration and noise occur when the belt supports engaged with the belt disengage from the belt from the engaged state, which is problematic.

SUMMARY OF THE INVENTION

Accordingly, the present invention has been made keeping in mind the above problems occurring in the related art, and is intended to provide a structure that enables two bands of ratchet-type chain belts to be disposed in a driving pulley device and a driven pulley device. Teeth in the front portions of driving belt supports and driven belt supports and teeth in the rear portions of the driving belt supports and the driven belt supports are oriented in opposite directions. Front and rear ratchet gears formed on the driving belt supports and the front and rear ratchet gears formed on the driven belt supports are oriented in opposite directions and are arranged in alternating positions without being formed at corresponding positions in a line. Two bands of ratchet-type chain belts corresponding to the front and rear ratchet gears are wound on the driving and driven pulley devices, such that power can be transmitted in both directions by both of the driving and driven pulley devices.

It is also intended to provide a structure in which the driving belt supports disposed in the driving pulley device and the driven belt supports disposed in the driven pulley device are disposed at an incline like teeth of a helical gear in order to reduce vibration and noise when the ratchet-type chain belts engage with and disengage from the belt supports and increase the area where the ratchet gears of the belt supports adjoin the ratchets of the ratchet-type chain belts, thereby accurately transmitting power It is also intended to provide an output shaft device which is disposed below the input shaft. The output shaft device controls the output shaft based on the difference between the line speed of the power that is supplied from the input shaft and the line speed of the rotational force of the driven pulley device that is shifted. The planetary gear device disposed between the output front gear and the output rear gear determines the speed and direction of rotation of the output shaft connected to wheels of a vehicle.

In an aspect, the present invention provides a chain belt-type continuously variable transmission comprising a ratchet-type chain belt which is wound between a driving pulley device which receives power from an input shaft and a driven pulley shaft which transmits the power to an output shaft. Each of the driving and driven pulley devices includes pulley plates which are disposed in front of and behind a cylinder which is disposed in a central portion of a pulley shaft and operates in response to a hydraulic pressure that is input and output via first and second flow passages, the pulley plates facing each other, each of the pulley plates having a plurality of radial slide slots, and shift plates are disposed on the pulley shaft outside the front and rear pulley plates, the shift plates having involute grooves corresponding to the slide slots, the shift plates being guided by spiral ribs on the pulley shaft so as to spirally rotate. Belt supports are disposed between the front and rear pulley plates such that the belt supports are radially guided so as to contract or expand, both ends of the belt supports being inserted into the involute grooves of the shift plates through the slide slots so as to be guided thereby. Front and rear ratchet gears are provided on front and rear portions of upper surfaces of bodies of the belt supports, teeth of the front and rear ratchet gears being oriented in opposite directions, the teeth of the front and rear ratchet gears formed on the driving belt supports being oriented opposite to the teeth of the front and rear ratchet gears formed on the driven belt supports, and the front and rear ratchet gears formed on the driving belt supports and the front and rear ratchet gears formed on the driven belt supports are arranged in alternating positions without being formed at corresponding positions in a line. The ratchet-type chain belts include first and second chain belts which are wound on front and rear portions of the driving and driven pulley devices, each of the first and second chain belts having forward ratchets and reverse ratchets on an inner surface thereof which are configured so as to correspond to and are caught by the front and rear ratchet gears formed on the driving and driven belt supports.

As described above, the chain belt-type continuously variable transmission according to the present invention enables two bands of ratchet-type chain belts to be disposed in a driving pulley device and a driven pulley device. Teeth in the front portions of driving belt supports and driven belt supports and teeth in the rear portions of the driving belt supports and the driven belt supports are oriented in opposite directions. Front and rear ratchet gears formed on the driving belt supports and the front and rear ratchet gears formed on the driven belt supports are oriented in opposite directions and are arranged in alternating positions without being formed at corresponding positions in a line. Two bands of ratchet-type chain belts corresponding to the front and rear ratchet gears are wound on the driving and driven pulley devices, such that power can be transmitted in both directions by both of the driving and driven pulley devices.

In addition, the driving belt supports disposed in the driving pulley device and the driven belt supports disposed in the driven pulley device are disposed at an incline like teeth of a helical gear in order to reduce vibration and noise when the ratchet-type chain belts engage with and disengage from the belt supports and increase the area where the ratchet gears of the belt supports adjoin the ratchets of the ratchet-type chain belts, thereby accurately transmitting power Furthermore, an output shaft device is disposed below the input shaft. The output shaft device controls the output shaft based on the difference between the line speed of the power that is supplied from the input shaft and the line speed of the rotational force of the driven pulley device that is shifted. The planetary gear device disposed between the output front gear and the output rear gear determines the speed and direction of rotation of the output shaft connected to wheels of a vehicle.

BRIEF DESCRIPTION OF THE DRAWINGS

FIG. 19A, FIG. 19B and FIG. 19C are cross-sectional views showing the operational relationship of the planetary gear device according to the present invention.

DETAILED DESCRIPTION OF THE INVENTION

Hereinafter a chain belt-type continuously variable transmission according to the present invention will now be described in detail with reference to the accompanying drawings.

Figure 1:
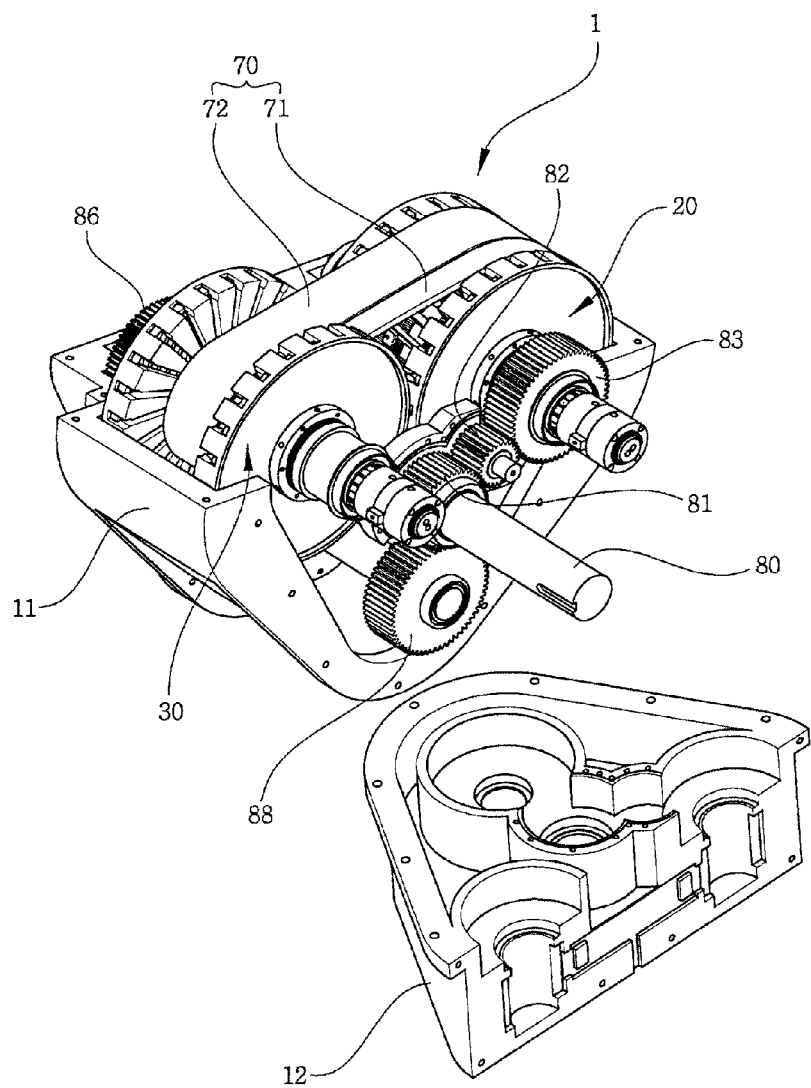
FIG. 1 a front perspective view showing the present invention.
Figure 2:
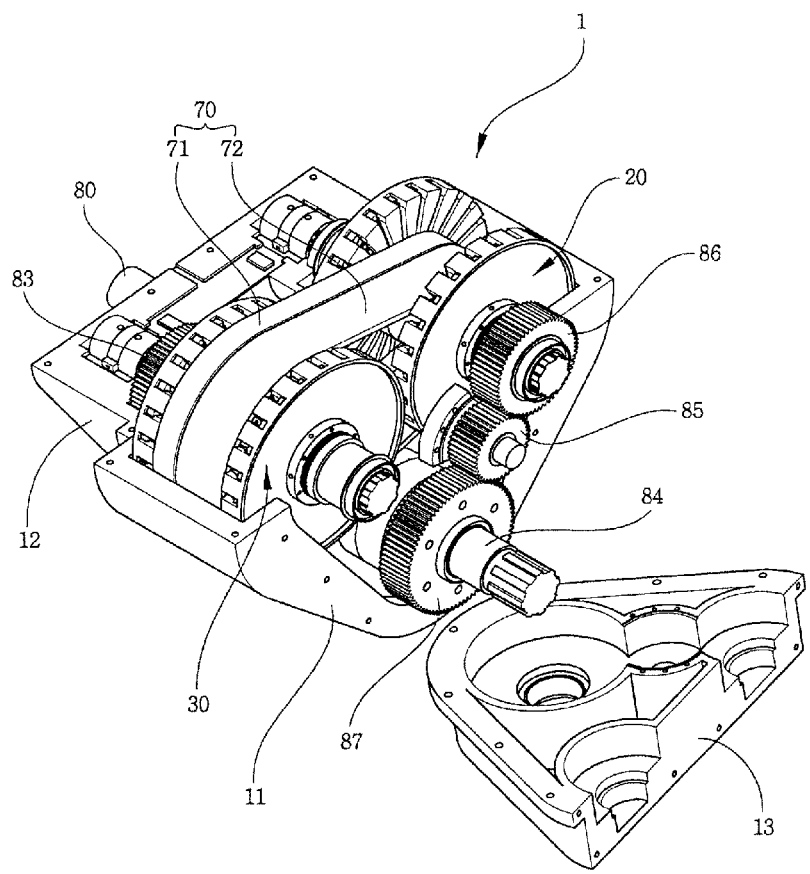
FIG. 2 is a rear perspective view showing the present invention.
Figure 8:
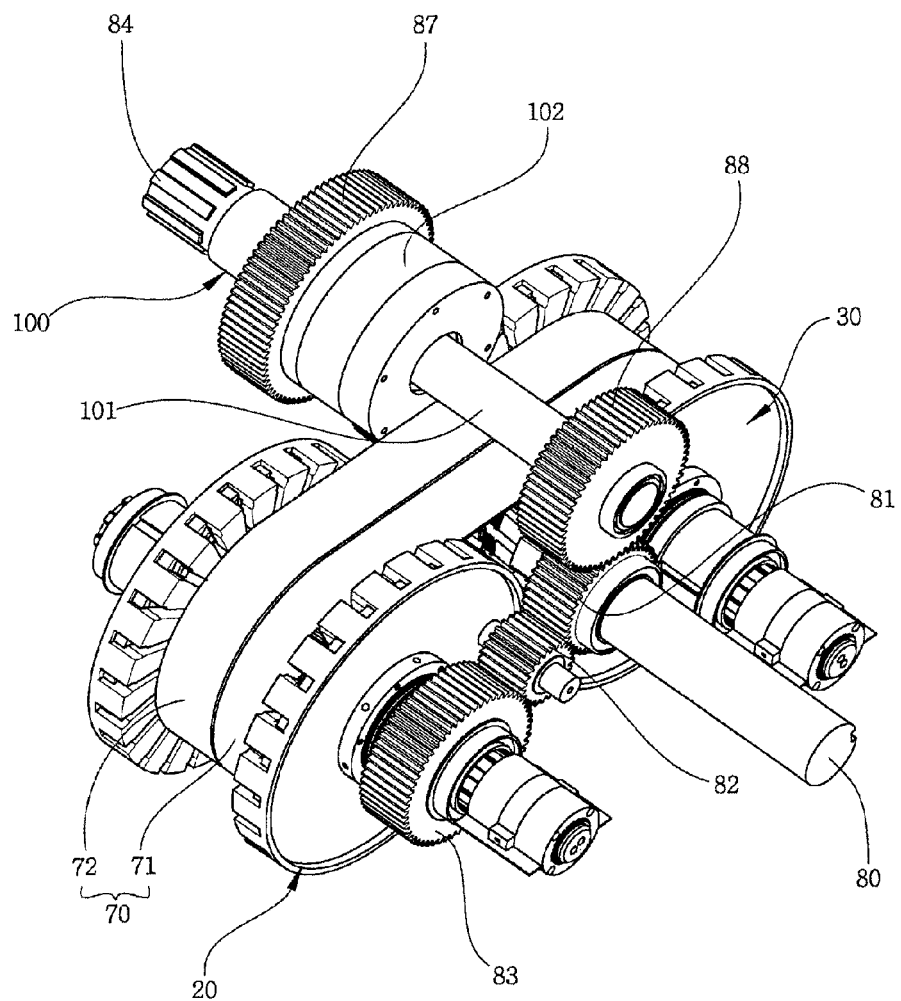
FIG. 8 is a bottom perspective view showing the transmission body according to the present invention.

FIG. 1 and FIG. 2 are front and rear perspective views showing a chain belt-type continuously variable transmission according to the present invention, in which an upper casing is omitted, and a front casing 12 and a rear casing 13 are exploded such that a gear connecting means which presents a power transmitting process is exposed. FIG. 8 is a bottom perspective view showing a transmission body 2 disposed in FIG. 1, which is rotated 180° in the clockwise direction.

As shown in FIG. 1, FIG. 2 and FIG. 8, the chain belt-type continuously variable transmission 1 includes a casing and a transmission body 2 disposed inside the casing. In the casing, front and rear casings 12 and 13 and an upper casing (not shown) are disposed on the front, rear and upper portions of a lower casing 11 such that they can be assembled to and disassembled from the lower casing. An input shaft 80 and an output shaft 84 protrude from the front and rear portions of the transmission body 2 and to the outside through the front and rear casings 12 and 13.

As shown in FIG. 5, FIG. 8, FIG. 11 and FIG. 12, the transmission body 2 includes driving and driven pulley devices 20 and 30 which are spaced apart from each other, two bands of ratchet-type chain belts 70 which are wound on the driving and driven pulleys 20 and 30, the input shaft 80 which transmits power from a power generator such as an engine or the like (a motor or the like in the case of an electric car) to the driving pulley device 20 and an output shaft device 100 through a gear connecting means, and the output shaft device 100 which determines the speed and direction of rotation of output power based on the difference in line speed between power that is inputted at the input shaft 80 and power that is speed-changed at the driving and driven pulley devices 20 and 30.

As shown in FIG. 6, FIG. 7, FIG. 11 and FIG. 12, the driving and driven pulley devices 20 and 30 will be described together, since they have the same configuration except for the respective positions where the driving pulley-side front gear 82 and the driven pulley-side rear gear 86 are disposed.

The driving and driven pulley devices 20 and 30 are disposed such that they can freely move forward and backward in the state a pulley plate fixture 46 is sealed to the central outer circumference of a pulley shaft 40. A pair of pulley plates 50 is disposed in front and behind the pulley plate fixture 46 such that the pulley plates 50 face each other. Shift plates 52 are disposed outside the front and rear pulley plates 50, and transport mounts 54 are assembled to the shift plates 52 such that it can spirally move on the outer portion of the pulley shaft 40.

A piston portion 44 which forms a cylinder 47 together with the pulley plate fixture 46 protrudes out from the central outer circumference of the pulley shaft 40 inside the pulley plate fixture 46. Spiral ribs 45, a spline shaft portion 43a, spiral ribs 45, a spline shaft portion 43 and a leading end shaft portion 41 are sequentially formed. The spiral ribs 45 and the spline shaft portion 43a are formed on the pulley shaft 40 behind the pulley plate fixture 46, and the spiral ribs 45 and the spline shaft portion 43 are formed on the pulley shaft in front of the pulley plate fixture 46. First and second flow passages 48 and 49 through which hydraulic pressure is supplied are formed inside the pulley shaft 40, extending from the leading end shaft portion 41 to the front and rear outer portions of the piston portion 44.

Here, spaces e and f are inside the pulley plate fixture 46, such that the piston portion 44 can reciprocally move inside the spaces e and f. The pulley plates 50 which are coupled to the front and rear sides of the pulley plate fixture 46 via bolts are provided with a plurality of radial slide slots 51. Each of the shift plates 52 has a plurality of involute grooves 53 in the surface that faces the pulley plate 50. The involute grooves 53 correspond to the slide slots 51 of the pulley plate 50. Each of the transport mounts 54 has spiral grooves 55 formed in the inner circumference thereof which are inserted into the spiral ribs 45 of the pulley shaft 40 such that the transport mounts 54 can spirally move in the lengthwise direction of the pulley shaft 40.

Since the pulley plate fixture 46 is moved forward and backward in the sealed state and the piston portion 44 is disposed on the pulley shaft 40 inside the pulley plate fixture 46 as described above, the pulley plate fixture 46 which acts as a cylinder barrel and the inside piston portion 44 form the cylinder 47. A packing (not shown) must be disposed on the portions of the pulley plate fixture 46 which adjoin the outer circumferences of the front and area pulley shafts such that hydraulic pressure does not leak.

In addition, instead of guiding the shift plates 52 so as to spirally rotate on the pulley shaft 40 due to the structure in which the spiral grooves 55 formed on the inner circumference of the transport mounts 54 are inserted into the spiral ribs 45 formed on the pulley shaft 40 in the state in which the shift plates 52 are coupled with the transport mounts 54, it is possible to make the inner circumference of the shift plates 52 be guided by the spiral ribs 45 so as to spirally rotate.

In addition, gear fixtures 56 are spline-coupled to the front and rear spline shaft portions 43 and 43a, and an oil in/out port 42 having oil inlet and outlet holes 42a which communicate with first and second flow passages 48 and 49 is disposed in the leading end shaft portion 41. Belt supports 60 are inserted between the front and rear pulley plates 50. Front and rear slide guides 65 of the belt supports 60 are inserted into the slide slots 51 such that they are guided in the radial direction.

Guide protrusions 64 formed on both ends of the slide guides 65 are inserted into the involute grooves 53 of the shift plates 52 so as to be guided thereby.

Figure 5:
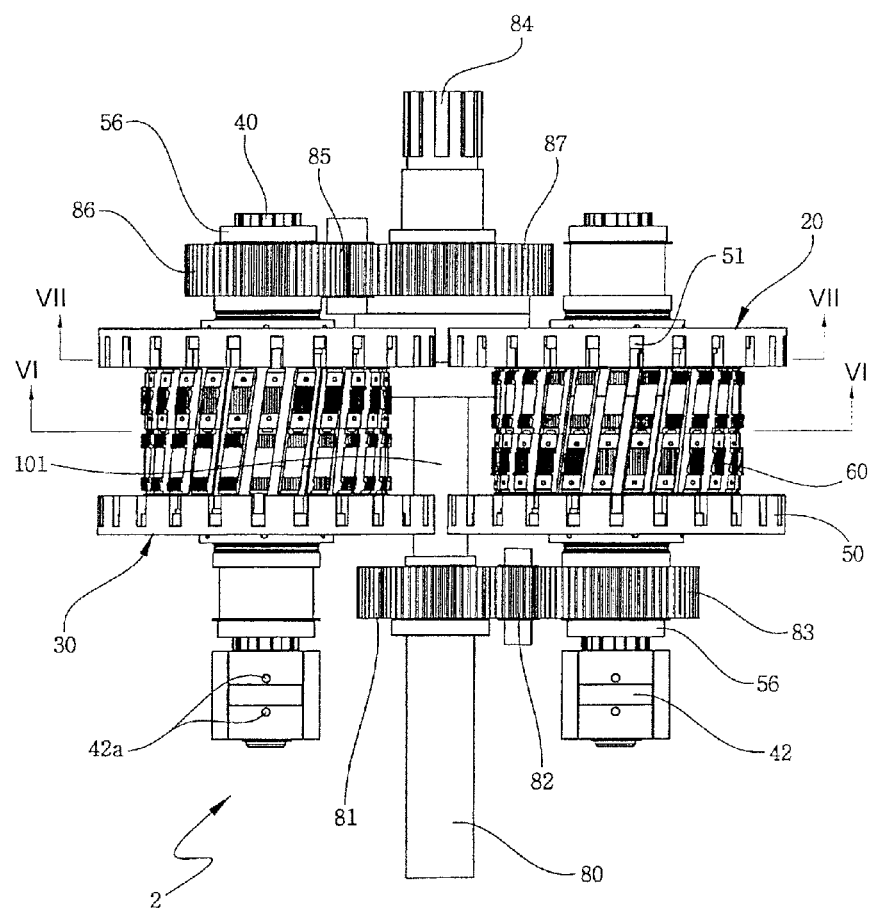
FIG. 5 is a top plan view showing the transmission body according to the present invention.
Figure 6:
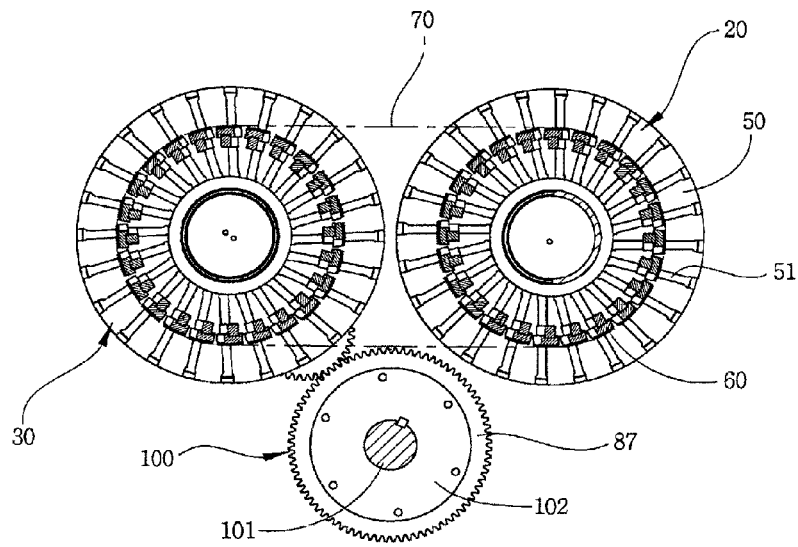
FIG. 6 is a cross-sectional view taken along line VI-VI in FIG. 5.
Figure 7:
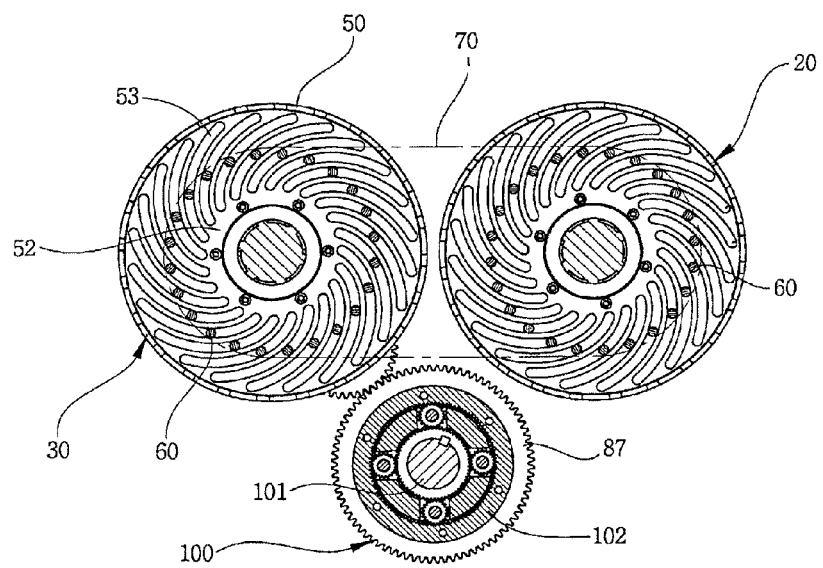
FIG. 7 is a cross-sectional view taken along line VII-VII in FIG. 5.
Figure 17:
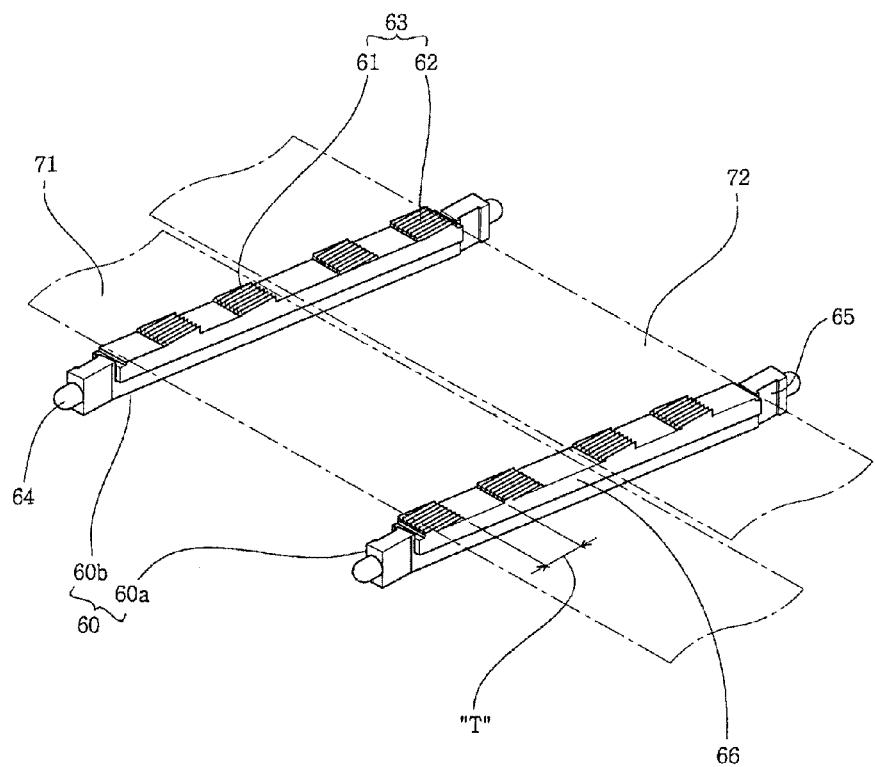
FIG. 17 is a perspective view showing the belt support according to the present invention.

Here, as shown in FIG. 5 and FIG. 17, each of the belt supports 66 has an inclined body 66. When the belt supports 66 are disposed between the front and rear pulley plates 50, the bodies 66 are inclined with respect to the centerline of the pulley shaft 40 and have the shape of a helical gear. Each of the both end guide protrusions 64 and the slide guides 65 is arranged to be horizontal and coaxial with the centerline.

Ratchet gears 63 including front and rear ratchet gears 61 and 62 are formed on the upper surface of the body 66 of the belt support 60. The teeth of the front and rear ratchet gears 61 and 62 are formed on front and rear sections of the driving belt support 60a and the driven belt support 60b, and are oriented in the opposite directions. The teeth of the ratchet gears 63 formed on the driving belt support 60a and the teeth of the ratchet gears 63 formed on the driven belt support 60b are oriented in the opposite directions. The ratchet gears 63 formed on the driving belt support 60a are aligned in a line, and the ratchet gears 63 formed on the driven belt support 60b are aligned in a line. The two bands of ratchet-type chain belts 70 are wound on the driving pulley device 20 and the driven pulley device 30.

Figure 18:
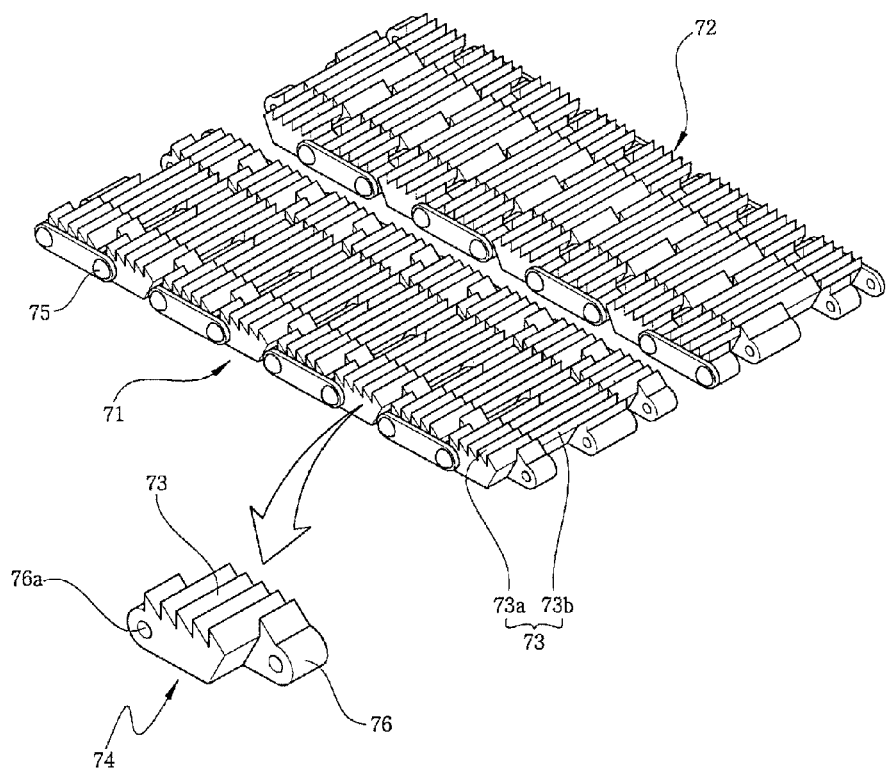
FIG. 18 is a perspective view showing a part of the ratchet-type chain belts corresponding to the belt supports shown in FIG. 17.

As shown in FIG. 1, FIG. 17 and FIG. 18, the ratchet-type chain belts 70 include a first chain belt 71 which is wound on the front side of the driving and driven pulley devices 20 and 30 and a second chain belt 72 which is wound on the rear side of the driving and driven pulley devices 20 and 30. Forward ratchets 73a and reverse ratchets 73b are formed on the inner surfaces of the first and second chain belts 71 and 72, i.e. the sides that adjoin the belt supports 60, such that they correspond to and are caught by the ratchet gears 63 formed on the driving belt support 60a and the driven belt support 60b. The forward ratchets 73a and reverse ratchets 73b are summarily referred to as ratchets 73.

The first and second chain belts 71 and 72 are configured by continuously connecting a plurality of chain belt pieces 74 with pins 75 like connecting a link-type metal watch chain. Each of the chain belt pieces 74 has pin-fitting portions 76 at the front and rear ends each of which has a pin hole 76a into which a pin 75 is fitted. The ratchets 73 are disposed between the front and rear pin-fitting portions 76 such that they correspond to and are caught by the ratchet gears 63 of the belt supports 60, whereby the plurality of chain belt pieces 74 are connected with the pins 75.

In an example of the chain belt piece 74 shown in FIG. 18, the front and rear pin-fitting portions 76 are alternately formed. As an alternative, it is of course possible that the front pin-fitting portions 76 are formed at intervals from each other and the opposite pin-fitting portions 76 be formed in central portions.

As shown in FIG. 1, FIG. 3, FIG. 5 and FIG. 8, the input shaft 80 is provided with a driving gear 81, a driving pulley-side front gear 83 is disposed on the front gear fixture 56 of the driving pulley device 20, and a front connecting gear 82 is disposed between the drive gear 81 and the driving pulley-side front gear 83. The other side of the driving gear 81 engages with an output front gear 88 which is disposed in the front portion of the output shaft device 100.

Here, gears (the front connecting gear, driving pulley-side front gear and the output front gear) which connect the power of the input shaft 80 to the driving pulley device 20 and the output shaft device 100 are referred to as a gear connecting means.

In addition, a means for transmitting the power of the input shaft 80 to the pulley shaft 40 of the driving pulley device 20 can be referred to as a first connecting means. The first connecting means includes the drive gear 81 which is disposed on the input shaft 80 and the driving pulley-side front gear 83 which is disposed on the pulley shaft 40 of the driving pulley device 20, the drive gear 81 and driving pulley-side front gear 83 being connected to the front connecting gear 82. The first connecting means can also be implemented as a chain or a timing belt.

Figure 4:
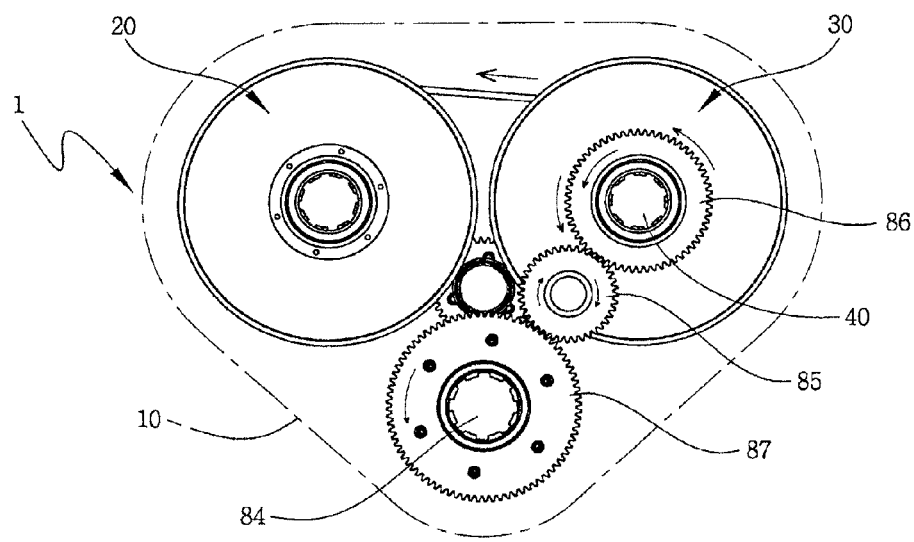
FIG. 4 is a rear elevation view showing the transmission body according to the present invention.

As shown in FIG. 2, FIG. 4 and FIG. 5, a rear connecting gear 85 is disposed between the driven pulley-side rear gear 86 which is disposed on the rear gear fixture 56 of the driven pulley device 30 and the output rear gear 87 which is disposed behind the output shaft 84. A means which includes the output rear gear 87 disposed on the output shaft 84 and the driven pulley-side rear gear 86 disposed on the pulley shaft 40 of the driven pulley device 30, the output rear gear 87 and the driven pulley-side rear gear 86 being connected to the rear connecting gear 85, can be referred to as a second connecting means. The second connecting means can also be implemented as a chain or a timing belt.

Figure 9:
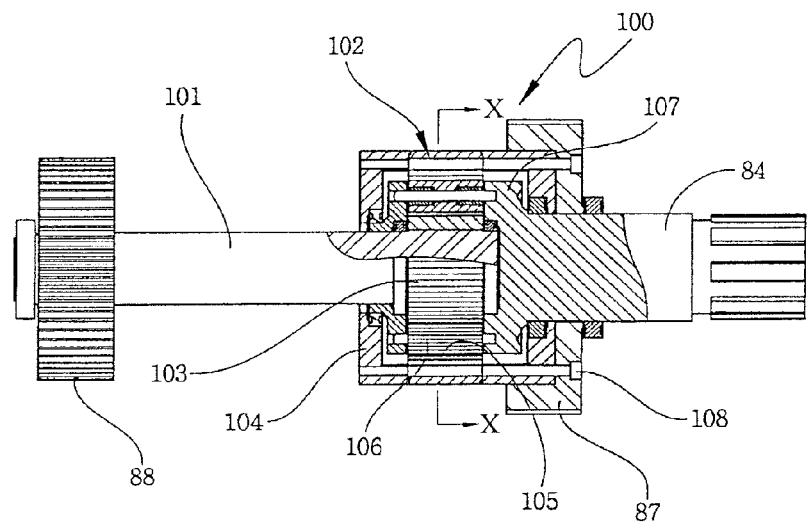
FIG. 9 is a top cross-sectional view of an output shaft device according to the present invention.
Figure 10:
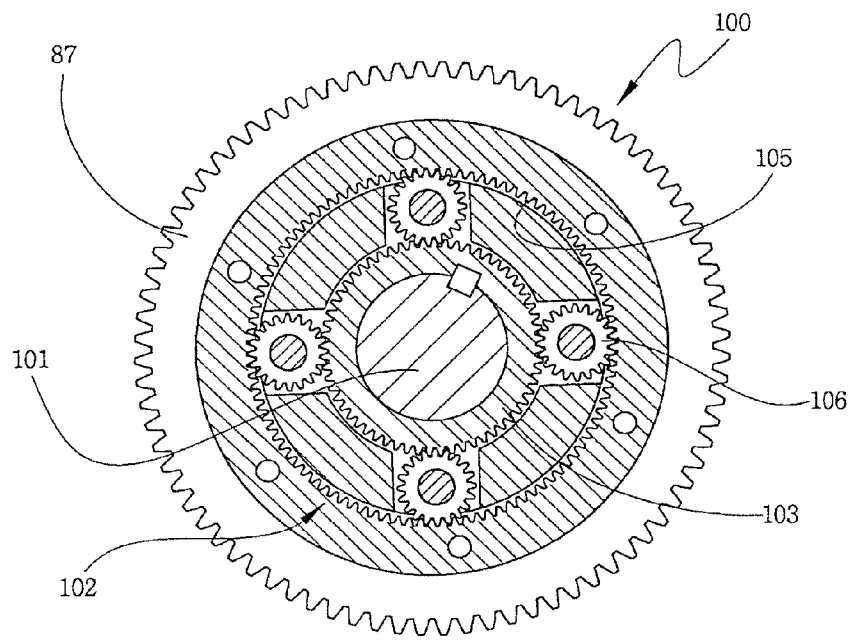
FIG. 10 is a cross-sectional view taken along line X-X in FIG. 9.

As shown in FIG. 8 to FIG. 10, the output shaft device 100 includes a planetary gear device 102 which is connected to the front portion of the output rear gear 87 which is disposed on the outer circumference of the output shaft 84 so as to remain idle. The planetary gear device 102 includes a ring-shaped inner gear 105 which is fixed to the inner circumference of the casing 104 coupled to the output rear gear 87, a sun gear 103 which is disposed at the center of the inner gear 105, and a plurality of planet gears 106 which are disposed between the outer circumference of the sun gear 103 and the inner circumference of the inner gear 105. The planet gears 106 engage with the sun gear 103 and the inner gear 105.

The sun gear 103 is fixed to the rear end of an output front shaft 101 on which the output front gear 88 is disposed, and the plurality of planet gears 106 are disposed on planet gear mounts 107 which are formed on the end of the output shaft 84 which is inserted into the casing of the planetary gear device 102.

Figure 13:
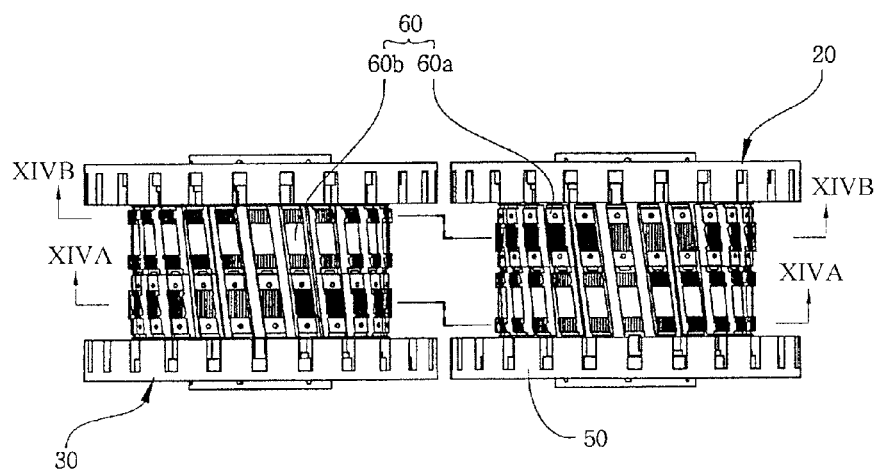
FIG. 13 is a top plan view partially showing a driving pulley device and a driven pulley device according to the present invention.
Figure 14:
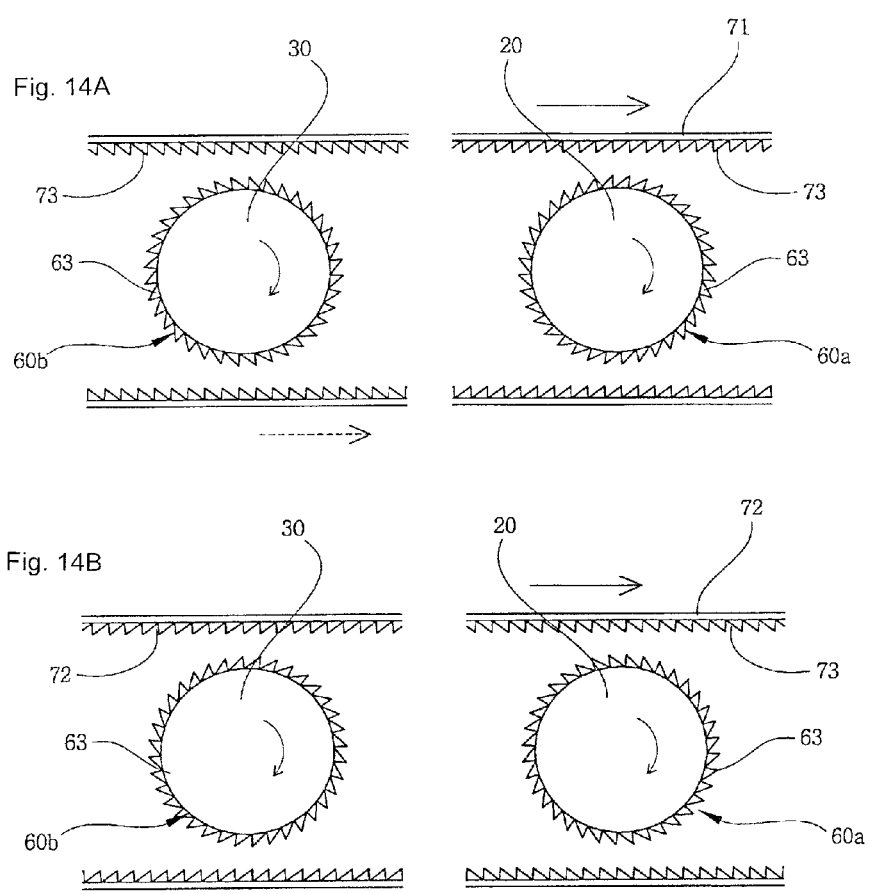
FIG. 14A and FIG. 14B are cross-sectional views taken along line XIVA-XIVA and line XIVB-XIVB in FIG. 13.

The belt supports 60 shown in FIG. 5 and FIG. 13 are illustrated so as to show that three ratchet gears 63 are formed, and the belt supports 60 shown in FIG. 17 are illustrated so as to show that four ratchet gears 63 are formed. However, it should be understood that the number of the ratchet gears 63 can be changed depending on the capacity and size of the continuously variable transmission according to the present invention.

Reference will now be made to the functional relationship of the present invention having the above-described configuration with reference to FIG. 1 to FIG. 19C.

Figure 3:
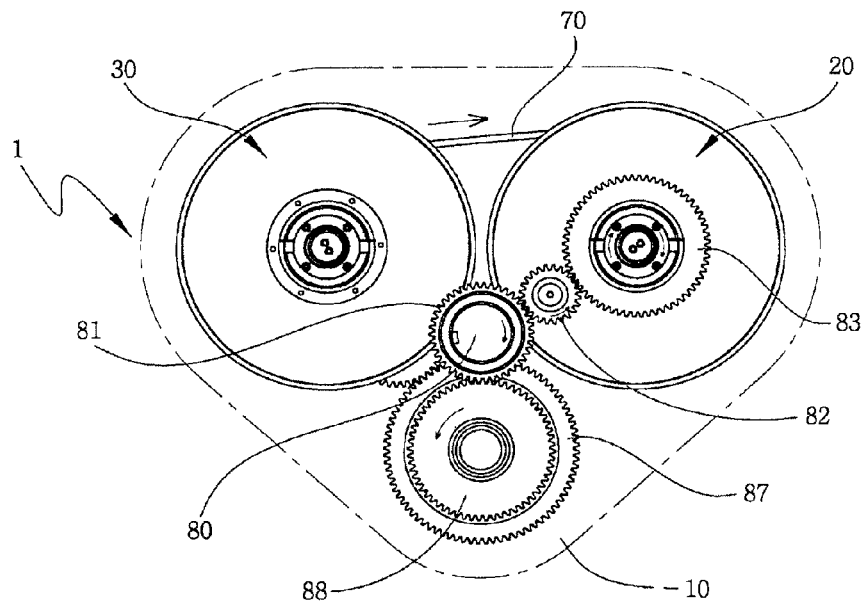
FIG. 3 is a front elevation view showing a transmission body according to the present invention.

First, the process of transmitting power according to the present invention will be described. As shown in FIG. 1 and FIG. 3, when power supplied from the power generator such as an engine is transmitted to the input shaft 80, the power is transmitted to each of the output front gear 88 and the front connecting gear 82 which are engaged with the driving gear 81 disposed on the input shaft 80. The power transmitted to the output front gear 88 is transmitted to the output shaft device 100 on which the output front gear 88 is disposed, and the power transmitted to the front connecting gear 82 acts to rotate the driving pulley device 20 via the driving pulley-side front gear 83.

Since the driving pulley device 20 which rotates in this fashion is connected to the driven pulley device 30 which is at the other side via the ratchet-type chain belts 70, the driven pulley device 30 is rotated along with the driving pulley device 20. As shown in FIG. 2, FIG. 4 and FIG. 5, the rotating force of the driven pulley device 30 is transmitted to the driven pulley-side rear gear 86 which is disposed behind the pulley shaft 40 of the driven pulley device 30, the rear connecting gear 85 engaged with the driven pulley-side rear gear 86, and the output rear gear 87 engaged with the rear connecting gear 85.

At this time, as shown in FIG. 8 to FIG. 10, in the output shaft device 100 on which the output rear gear 87 is disposed, the power is being transmitted to the rear output rear gear 87 and the front output front gear 88. Since the power transmitted to the output front gear 88 is the power transmitted from the engine, and the power transmitted to the output rear gear 87 is the power that is shifted via the driving and driven pulley devices 20 and 30, a difference in the speed between the front output front gear 88 and the rear output rear gear 87 occurs in the output shaft device 100.

The planetary gear device 102 disposed between the output front gear 88 and the output rear gear 87 determines the speed and direction of rotation of the output shaft 84 connected to wheels of a vehicle. As shown in FIG. 9, in the sun gear 103, the output front gear 88 which receives the power from the engine is disposed on the output front shaft 101, and the output rear gear 87 which receives the shifted power from the driving and driven pulley devices 20 and 30 is coupled with the inner gear 105 in the state in which it is idling around the outer circumference of the output shaft 84, such that the rotating force of the output rear gear 87 is transmitted to the inner gear 105.

Figures 19A, 19C:
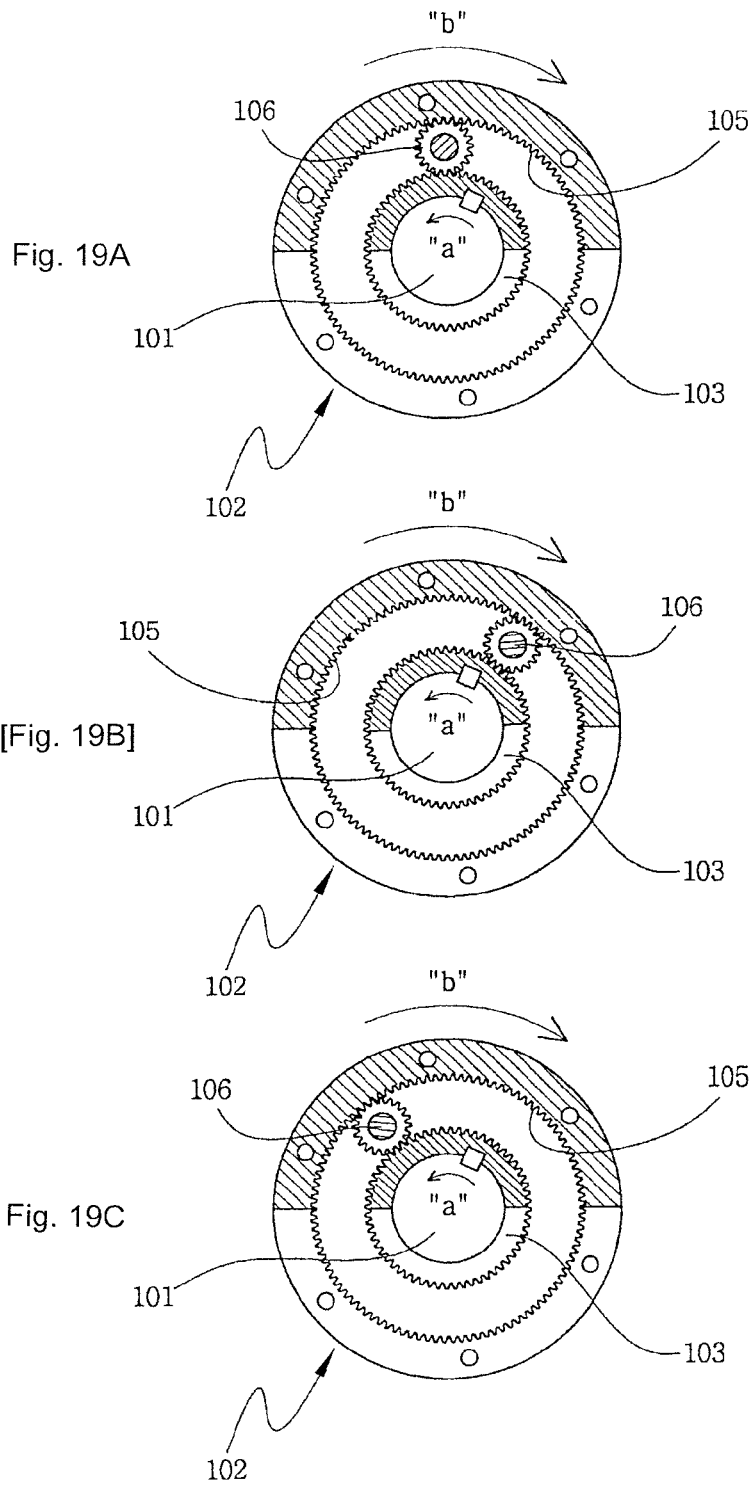

In this state, as shown in FIG. 19A, the driving force of the engine that rotates the sung gear 103 and the shifted rotating force that rotates the inner gear 105 are identical with each other, so that the line speed "a" of the sung gear 103 becomes identical with the line speed "b" of the inner gear 105. Accordingly, the planet gear 106 which is engaged between the sun gear 103 and the inner gear 105 stops rotating.

As the planet gear 106 stops, the output shaft 84 on which the planet gear mount 107 which supports the planet gear 106 is integrally disposed, as shown in FIG. 9, stops rotating, so that the wheels of the vehicle connected to the output shaft 84 stop, thereby stopping the vehicle.

In addition, as shown in FIG. 19B, when the driving force of the engine that rotates the sun gear 103 is smaller than the shifted rotating force that rotates the inner gear 105, the line speed "b" of the inner gear 105 is faster than the line speed "a" of the sun gear 103. Accordingly, the planet gear 106 which is engaged between the sun gear 103 and the inner gear 105 rotates in the direction "c" in which the inner gear 105 rotates.

As the planet gear 106 rotates in the direction "c" in which the inner gear 105 rotates, the output shaft 84 on which the planet gear 107 which supports the planet gear 106 is integrally disposed and to which wheels of the vehicle are connected, as shown in FIG. 9, rotates in the direction in which the inner gear 105 rotates, so that the wheels of the vehicle rotate in the direction in which the inner gear 105 rotates.

In addition, as shown in FIG. 19C, when the driving force of the engine that rotates the sun gear 103 is greater than the shifted rotating force that rotates the inner gear 105, the line speed "a" of the sun gear 103 is faster than the line speed "b" of the inner gear 105. Accordingly, the planet gear 106 which is engaged between the sun gear 103 and the inner gear 105 rotates in the direction "d" in which the sun gear 103 rotates.

As the planet gear 106 rotates in the direction "d" in which the sun gear 103 rotates, the output shaft 84 on which the planet gear 107 which supports the planet gear 106 is integrally disposed and to which wheels of the vehicle are connected, as shown in FIG. 9, rotates in the direction in which the sun gear 103 rotates, so that the wheels of the vehicle rotate in the direction in which the sun gear 103 rotates.

Reference will now be made to the process in which shifting is conducted by the driving and driven pulley devices 20 and 30 and the ratchet-type chain belts 70.

Figure 11:
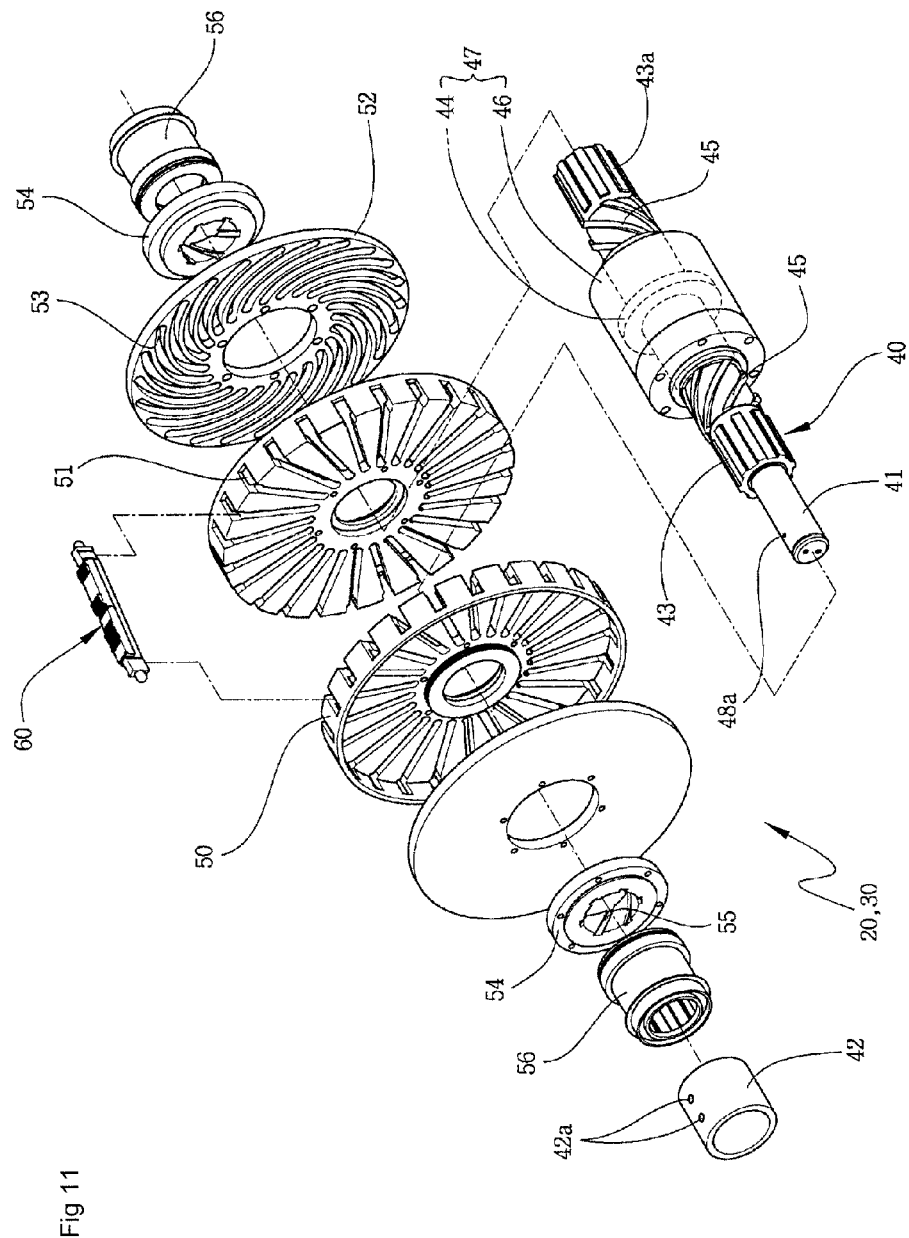
FIG. 11 is an exploded perspective view of a pulley device according to the present invention.
Figure 12:
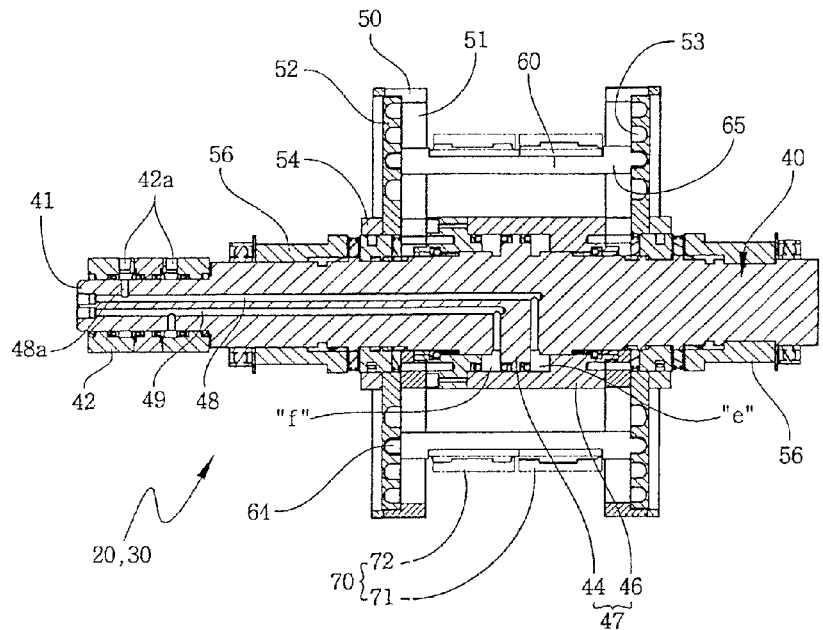
FIG. 12 is a longitudinal cross-sectional view of the pulley device according to the present invention.

As shown in FIG. 11 and FIG. 12, in the belt-type continuously variable transmission according to the present invention, a hydraulic pressure supplying device (not shown) is connected to the oil in/out port 42 of the pulley shaft 40 which is disposed at either of the center of the driving pulley device 20 and the center of the driven pulley device 30, such that hydraulic pressure is supplied to the pulley shaft 40. Accordingly, in response to actuation of the cylinder, the diameter of the pulley on which the ratchet-type chain belts 70 are wound is contracted or expanded depending on the direction in which the hydraulic pressure is supplied.

When the outer diameter of the driving pulley device 20 is expanded and the outer diameter of the driven pulley device 30 is contracted in this fashion, the speed of the driven pulley device 30 becomes faster. In contrast, when the outer diameter of the driving pulley device 20 is contracted and the outer diameter of the driven pulley device 30 is expanded, it is obvious that the speed of the driven pulley device 30 becomes slower.

At this time, the pulley places 50 in front of and behind the driving and driven pulley devices 20 and 30 have not moved forward/backward into the casing. In this state, when the hydraulic pressure is supplied into the first flow passage 48 of the pulley shaft 40, the rear portion of the piston portion 44 and the inner space 3 of the pulley plate fixture 46 are expanded, so that the pulley shaft 40 moves forward. In contrast, when the hydraulic pressure is supplied to the second flow passage 49, the pulley shaft 40 moves backward.

When the pulley shaft 40 horizontally moves toward the front or rear side depending on the situation where the hydraulic pressure is supplied to first and second flow passages 48 and 49 as mentioned above, the front and rear shift plates 52 rotate in the spiral direction, since the pulley plates 50 are fixed with bolts in front of and behind the pulley plate fixture 46, the spiral ribs 45 are formed on the pulley shafts 40 in front of and behind the pulley plates 50, and the spiral grooves 55 of the transport mounts 54 which fix the shift plates 52 with bolts are engaged with the spiral ribs 45.

In this fashion, in the slide slots 51 of the pulley plates 50 and the involute grooves 53 of the shift plates 52 which correspond to and overlap each other, as shown in FIG. 12 and FIG. 17, the guide protrusions 64 formed on the front and rear ends of the belt supports 60 are inserted into the involute grooves 53 of the shift plates 52 through the slide slots 51 of the pulley plates 50. Since the slide guides 65 integrally formed with the guide protrusions 64 are inserted into the slide slots 51 of the pulley plates 50, the guide protrusions 64 move first along the involute grooves 53 in the direction in which the shift plates 52 are rotated while drawing an arc-shaped track.

At this time, since the front and rear slide guides 65 of the belt supports 60 which are integrally formed with the guide protrusions 64 are in the state in which they are inserted into the linear slide slots 51 of the pulley plates 50 which are formed in the corresponding radial direction, the belt supports 60 which have formed the guide protrusions 64 and the slide guides 65 are contracted toward the center of the pulley shaft 40 or expanded toward the outer circumference of the pulley plates 50 depending on the direction in which the shift plates 52 rotate.

When the plurality of belt supports 60 which is disposed between the front and rear pulley plates 50 as mentioned above is contracted or expanded, the diameter of the driving pulley device 20 is increased while the diameter of the driven pulley device 30 is decreased or the diameter of the driving pulley device 20 is decreased while the diameter of the driven pulley device 30 is increased, since the ratchet-type chain belts 70 are wound on the outer circumference of the driving and driven pulley devices 20 and 30. Accordingly, the chain belt-type continuously variable transmission 1 according to the present invention can conduct shifting based on the difference in the outer diameter between the driving and driven pulley devices 20 and 30.

In addition, when the pulley shaft 40 horizontally moves forward or backward, the gear fixtures 56 can transmit power as required while rotating in the process in which the spline shaft portions 43 and 43a horizontally move forward and backward, since the gear fixtures 56 around each of which the gear is disposed are spline-coupled with the front and rear spline shaft portions 43 and 43a.

When the driven pulley device 30 is rotated forward (clockwise) in response to the power of the engine transmitted through the input shaft 80 in the state in which the diameters of the driving and driven pulley devices 20 and 30 are changed so that the above-mentioned shifting is conducted, the ratchet-type chain belts 70 run in response to rotation of the driving pulley device 20, since the ratchet-type chain belts 70 are locked to the circumference of the driving and driven pulley devices 20 and 30, the ratchet gears 63 are formed on the belt supports 60 which are radially disposed in the driving and driven pulley devices 20 and 30, and the ratchets 73 are formed on the ratchet-type chain belts 70 which correspond to the ratchet gears 63 such that the ratchets 73 are caught by the ratchet gears 63, as shown in FIG. 1, FIG. 6, FIG. 16 and FIG. 17. The ratchet-type chain belts 70 consequently pull the driven pulley device 30, so that the driving and driven pulley devices 20 and 30 rotate in the clockwise direction.

At this time, as shown in FIG. 5 and FIG. 17, since the belt supports 60 are disposed at an incline like helical gears between the front and rear pulley plates 50, and the ratchet gears 63 formed on the belt supports 60 and the ratchets 73 of the ratchet-type chain belts 70 which adjoin the ratchet gears 63 in an engaging fashion, when the ratchet gears 63 of the belt supports 60 adjoin the ratchets 73 of the ratchet-type chain belts 70, the ratchets 73 and the ratchet gears 63 do not adjoin altogether but sequentially adjoin each other from one side. Consequently, it is possible to minimize impact and noise that occurs in the process in which the belt supports 60 adjoin the ratchet-type chain belts 70.

In addition, as shown in FIG. 1, FIG. 17 and FIG. 18, the front first chain belt 71 and the rear second chain belt 73 of the ratchet-type chain belts 70 are disposed such that they are wound in two lines on the front and rear sides of the driving and driven pulley devices 20 and 30, and the ratchets 73 formed on the inner surfaces of the first and second chain belts 71 and 72 are caught by the corresponding ratchet gears 63 formed on the outer surfaces of the driving belt support 60a and the driven belt support 60b.

Figure 15:
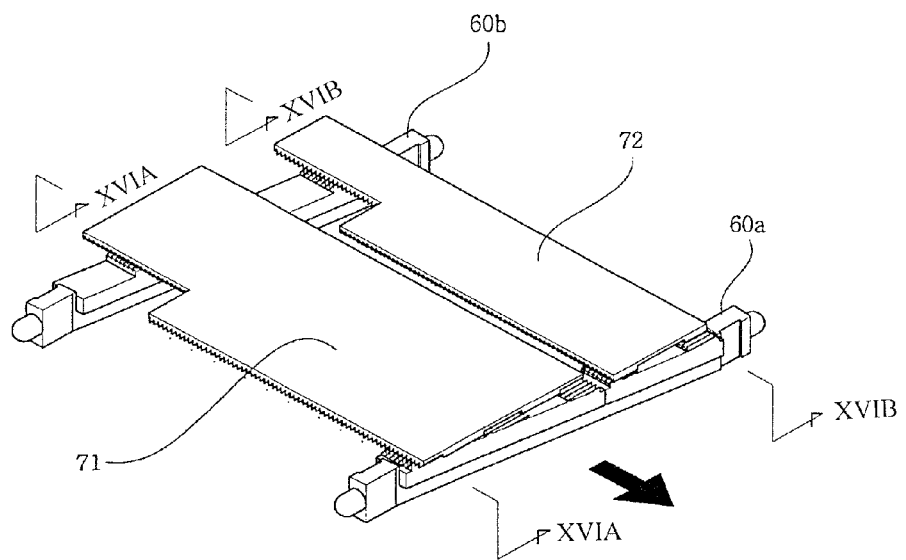
FIG. 15 is an explanatory view showing the operational relationship between a belt support and a ratchet-type chain belt.
Figure 16A:
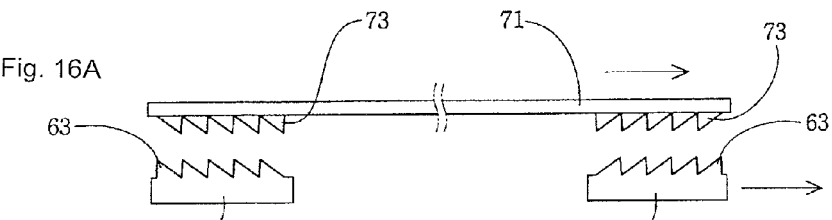
FIG. 16A and FIG. 16B are explanatory views of the operational relationship taken along line XVIA-XVIA and line XVIB-XVIB in FIG. 15.

In this state, when the vehicle moves forward or backward or drives uphill on a slope in response to power from the engine, the driving pulley device 20 is rotated by the power transmitted to the input shaft 80. At this time, as shown in FIG. 14A, FIG. 15 and FIG. 16A, the ratchet gears 63 of the driving belt support 60a, which are rotating in the same direction, pull the ratchets 73 of the first chain belt 71 which are caught thereby. The ratchets 73 of the first chain belt 71 which are being pulled in this way are caught by the ratchet gears 63 of the driven belt support 60b, the teeth shape of which is opposite to that of the ratchet gears 63 formed on the driving belt support 60a, and pull the driven belt support 60b in the direction in which the driving pulley device 20 on which the driving belt support 60*a* is disposed, so that the driven pulley device 30 on which the driven belt support 60*b* is disposed also rotates in the direction in which the driving pulley device 20 rotates.

As shown in FIG. 15, FIG. 16A and FIG. 17, referring to the part on which the first chain belts 71 are wound, two ratchet gears 63 formed on the driving belt support 60*a* are spaced apart from each other at intervals T such that the vertical portions of the ratchet gears 63 are directed to the right, and the ratchet gears 63 formed on the driven belt support 60*b* are formed at positions corresponding to the intervals T between the two ratchet gears 63 formed on the driving belt support 60*a* such that their teeth shape faces in the opposite direction. The ratchets 73 formed on the first chain belt 71 which is wound on the outer circumference of the driving belt support 60*a* and the driven belt support 60*b* are arranged so as to correspond to the ratchet gears 63 formed on the driving belt support 60*a* and the driven belt support 60*b*. Consequently, the driving belt support 60*a* disposed in the driving pulley device 20 pulls the first chain belt 71, which in turn pulls the driven belt support 60*b*, so that the driven pulley device 30 in which the driven belt support 60*b* is disposed is pulled and rotated in the direction in which the driving pulley device 20 rotates.

In this state, referring to the rear part on which the second chain belt 72 is wound in FIG. 14B, FIG. 15, FIG. 16B and FIG. 17, the direction in which the ratchet gears 63 formed on the driving belt support 60*a* are inclined is in the right direction in which the driving belt support 60*a* rotates. Thus, the ratchet gears 63 of the driving belt support 60*a* do not pull the ratchets 73 of the second chain belt 72. Consequently, the second chain belt 72 rotates in response to the driving and driven pulley devices 20 and 30 which are rotated by the front driving and driven belt supports 60*a* and 60*b* and the first chain belt 71 which is wound on the driving and driven belt supports 60*a* and 60*b*.

In the above description, the rotation of the driving and driven pulley devices 20 and 30 on which the first chain belt 71 is wound when the driving and driven pulley devices 20 and 30 move forward or backward while a vehicle is being driven on level land or drives on an uphill in response to power transmitted from the engine is indicated with solid arrows.

The following description is given to describe a case in which the power of the engine is not transmitted, for example, when the vehicle is moving downhill or using an engine brake. At this time, as shown in FIG. 2, FIG. 4, FIG. 5 and FIG. 9, the output shaft 84 connected to the wheels of the vehicle rotates the driven pulley device 30 through the planetary gear device 102 of the output shaft device 100 on which the output shaft 84 is disposed and through the output rear gear 87, the rear connecting gear 85 and the driven pulley-side rear gear 86.

Figure 16B:
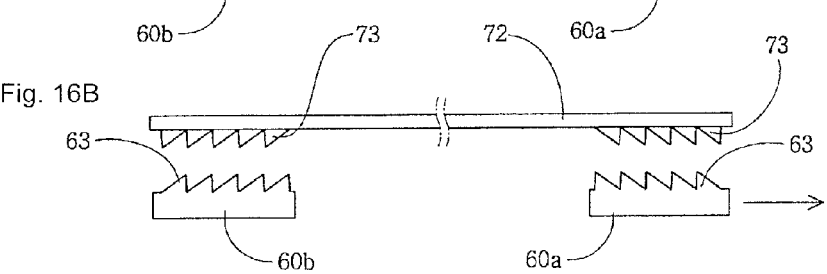

When the driven pulley device 30 which is allowed to rotate in this fashion rotates forward, as indicated with solid arrows in FIG. 14B, FIG. 15 and FIG. 16B, the ratchet gears 63 of the driven belt support 60*b* which is disposed in the driven pulley device 30 push the ratchets 73 of the second chain belt 72 in the forward direction. As the second chain belt 72 is pushed in this way, the ratchets 73 of the second chain belt 72 push the ratchet gears 63 of the driving pulley device 20 which are engaged therewith, so that the driving pulley device 20 rotates forward.

At this time, as shown in FIG. 14A, FIG. 15 and FIG. 16A, when the driven pulley device 30 rotates forward, the front first chain belt 71 only rotates in response to the driving and driven pulley devices 20 and 30 which rotate at the side where the second chin belt 72 is disposed, since the ratchet gears 63 of the driven belt support 60*b* disposed in the driven pulley device 30 are arranged in the direction in which they cannot push the ratchets 73 of the first chain belt 71 in the forward direction.

As shown in FIG. 18, the above-described chain belt 70 is configured by continuously connecting the plurality of chain belt pieces 74 with the pins 75, each chain belt piece 74 has the front and rear pin-fitting portions 76, each of which has the pin hole 76*a* into which the pin 75 is fitted. The ratchets 73 are disposed between the front and rear pin-fitting portions 76 such that they correspond to and are caught by the ratchet gears 63 of the belt supports 60. Accordingly, the ratchets 73 can accurately catch and adjoin the ratchet gears 63 of the belt supports 60, thereby precisely transmitting the power. In addition, there is an advantage in that the operation of assembling the chain belt 70 according to the present invention is easy.

The process of changing the speed depending on the difference in the diameter between the driving pulley device 20 and the driven pulley device 30 when the driving and driven pulley devices 20 and 30 rotate is a known technique.

The invention claimed is:

1. A chain belt-type continuously variable transmission comprising a ratchet-type chain belt which is wound between a driving pulley device which receives power from an input shaft and a driven pulley shaft which transmits the power to an output shaft, wherein:
   each of the driving and driven. pulley devices includes pulley plates which are disposed in front of and behind a cylinder which is disposed in a central portion of a pulley shaft and operates in response to a hydraulic pressure that is input and output via first and second flow passages, the pulley plates facing each other, each of the pulley plates having a plurality of radial slide slots and shift plates are disposed on the pulley shaft outside the front and rear pulley plates, the shift plates having involute grooves corresponding to the slide slots, the shift plates being guided by spiral ribs on the pulley shaft so as to spirally rotate,
   belt supports are disposed between the front and rear pulley plates such that the belt supports are radially guided so as to contract or expand, both ends of the belt supports being inserted into the involute grooves of the shift plates through the slide slots so as to be guided thereby,
   front and rear ratchet gears are provided on front and rear portions of upper surfaces of bodies of the belt supports, teeth of the front and rear ratchet gears being oriented in opposite directions, the teeth of the front and rear ratchet gears formed on the driving belt supports being oriented opposite to the teeth of the front and rear ratchet gears formed on the driven belt supports, and the front and rear ratchet gears formed on the driving belt supports and the front and rear ratchet gears formed on the driven belt supports are arranged in alternating positions without being formed at corresponding positions in a line, and
   the ratchet-type chain belts include first and second chain belts which are wound on front and rear portions of the driving and driven pulley devices, each of the first and second chain belts having forward ratchets and reverse ratchets on an inner surface thereof which are configured so as to correspond to and are caught by the front and rear ratchet gears formed on the driving and driven belt supports.

2. The chain belt-type continuously variable transmission according to claim 1, wherein each of the bodies of the belt supports is formed at an incline and is disposed between the front and rear pulley plates so as to have a shape of a helical gear and be inclined from a centerline of the pulley shaft.

3. The chain belt-type continuously variable transmission according to claim 1 or 2, wherein the input shaft and the pulley shaft of the driving pulley device are connected by a first connecting means so as to rotate in an identical direction, an output shaft device is disposed below the input shaft, the output shaft device controlling the output shaft based on a difference between a line speed of the power that is supplied from the input shaft and a line speed of rotational force of the driven pulley device that is shifted, and the pulley shaft of the driven pulley device and an output rear gear which is disposed in the output shaft device are connected by a second connecting means so as to rotate in an identical direction.

4. The chain belt-type continuously variable transmission according to claim 3, wherein the output shaft device includes a planetary gear device which is connected to a front portion of the output rear gear which is disposed on an outer circumference of the output shaft so as to idle, a ring-shaped inner gear which is fixedly disposed on an inner circumference of a casing which is coupled with the output rear gear, a sun gear which is disposed at a center inside the inner gear, and a plurality of planet gears which are disposed between an outer circumference of the sun gear and an inner circumference of the inner gear so as to engage with the sun gear and the inner gear, wherein the sun gear is fixedly disposed on a rear end of an output front shaft which receives the power supplied from the input shaft and rotates in an opposite direction to the input shaft, and the planet gears are disposed on planet gear mournts which are formed on an end of the output shaft which is inserted into the casing.

5. The chain belt-type continuously variable transmission according to claim 3, wherein the first connecting means includes a driving pulley-side driving gear which is disposed on the input shaft, a driving pulley-side front gear which is disposed on the pulley shaft of the driving pulley device, and a front connecting gear which connects the driving pulley-side driving gear and the driving pulley-side front gear, and wherein the second connecting means includes an output rear gear which is disposed on the output shaft, a driven pulley-side rear gear which is disposed on the pulley shaft of the driven pulley device, and a rear connecting gear which connects the output rear gear and the driven pulley-side rear gear.

6. The chain belt-type continuously variable transmission according to claim 5, wherein each of the driving pulley-side front gear and the driven pulley-side rear gear is disposed on a gear fixture which is spline-coupled with a spline shaft portion of the pulley shaft.

7. The chain belt-type continuously variable transmission according to claim 1 or 2, wherein each of the chain belts is configured by continuously connecting a plurality of chain belt pieces with pins, wherein each of the chain belt pieces has pin-fitting portions at front and rear ends, each of which has a pin hole into which a corresponding one of the pins is fitted, and the ratchets are disposed between the front and rear pin-fitting portions such that they correspond to and are caught by the ratchet gears of the belt supports.

\* \* \* \* \*